INTERFEROMETER HAVING PLURAL SLIT SOURCE
Filed May 29, 1962 3 Sheets-Sheet 1
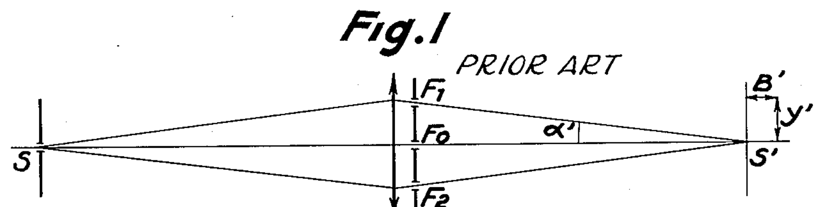
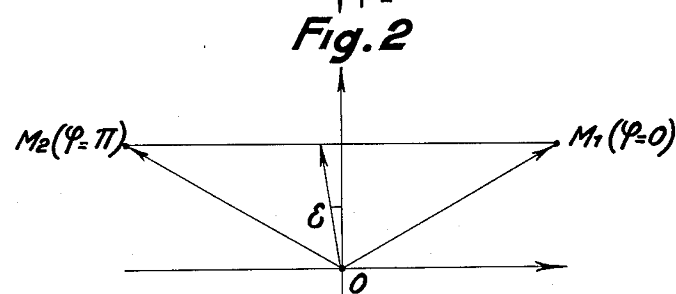
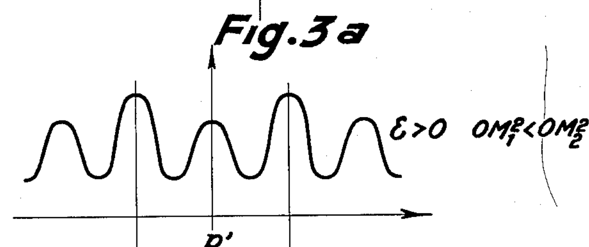
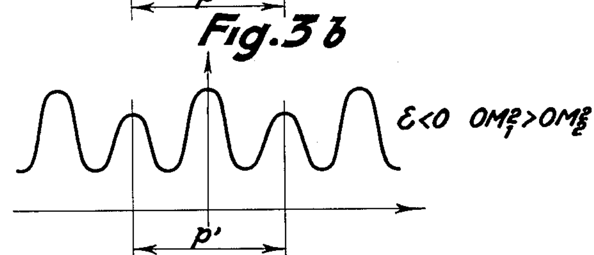
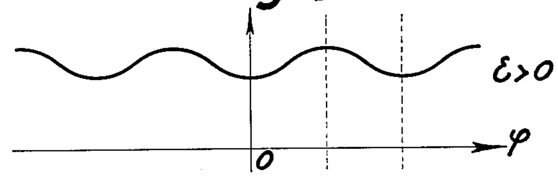
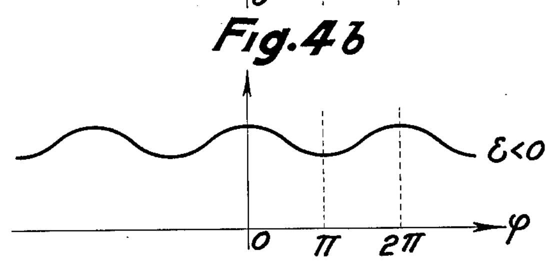

INTERFEROMETER HAVING PLURAL SLIT SOURCE

Filed May 29, 1962 3 Sheets-Sheet 3

United States Patent Office 3,232,165

Patented Feb. 1, 1966

3,232,165
INTERFEROMETER HAVING PLURAL SLIT SOURCE

Odette Marguerite Marie Dupuy and Robert Gaston André Marechal, Paris, Michèle Simone Marie Renault born Leclere, Cachan, Pierre Jean Marie Lostis, Bagneux, and Jacques Francois Henri Simon, Paris, France, assignors to Centre National de la Recherche Scientifique, Paris (Seine), France, a corporation of France Filed May 29, 1962, Ser. No. 198,592
Claims priority, application France, May 31, 1961, 898,518
4 Claims. (Cl. 88—14)

This invention relates to a method of measuring by interference and to its applications, particularly in refractometers.

It is known that ordinary high quality interference instruments have, in general, a limited precision. The applicants have sought to alleviate this disadvantage and, to this end, have restudied the phenomena present in the three slit Vaisala-Zernike apparatus, well known for its high sensitivity.

It is an object of the invention to provide a method of increased sensitivity for measuring path length differences.

It is a further object of the invention to provide a method of increased sensitivity particularly adapted to the measurement of physical phenomena, such as refractive indices, surface curvatures, and the exact location of longitudinal points.

It is also an object of the invention to provide a means for practicing the method.

These, and other objects, will appear in the course of the following description made with reference to the accompanying drawings, in which:

FIGURE 1 diagrammatically shows the Vaisala-Zernike interference instrument;

FIGURE 2 shows the oscillation of the amplitude in the complex plane;

FIGURES 3*a* and 3*b* diagrammatically show the change in the energy distribution caused by a change in sign of $\epsilon$;

FIGURES 4*a* and 4*b* show the illumination curve for an instrument of the invention;

Figure 5:
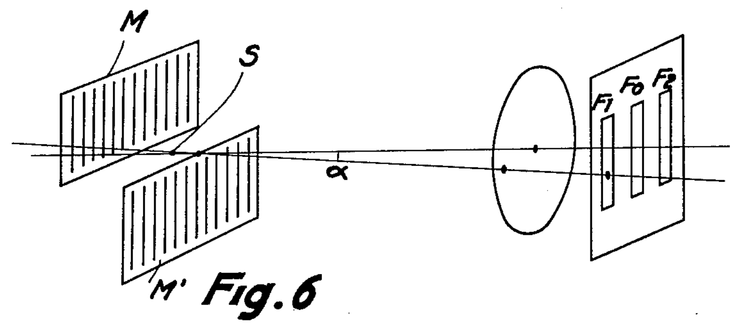
FIGURE 5 shows the arrangement between two patterns and three slits.

The Vaisala-Zernike interference instrument, which is capable of checking a phase shift of $\pi/2$, consists (FIG. 1) of an arrangement similar to that of the slits of Young, except that the two slits are replaced by three slits $F_0$, $F_1$, $F_2$, assumed here to be of equal width, and illuminated by a source S. As is known, there is thus obtained in the image plane of the source (consisting of a slit S) a pattern of fringes having two series of unequal maxima. If, in any known way, there is introduced into the light leaving the central slit $F_0$ an approximate quadrature (a phase shift of $\pi/2+\epsilon$), the complex amplitudes issuing from slits $F_0$, $F_1$, and $F_2$ are respectively:

$$e^{j\left(\frac{\pi}{2}+\epsilon\right)},\ e^{j\psi},\ \text{and}\ e^{-j\psi}$$

where $\psi$ is the phase difference between the vibrations issuing from slits $F_0$ and $F_1$ arising from the shift Y′ from S′ to B′ in the image plane of source S. Letting $\alpha'$ be the angle between waves issuing from slits $F_0$ and $F_1$, $\psi$ is defined as equal to $2/\lambda\, Y'\, \alpha'$.

As a consequence of this, the sum of the amplitude at images B′ can be written $$e^{j\left(\frac{\pi}{2}+\epsilon\right)}+e^{j\psi}+e^{-j\psi}\simeq j-\epsilon+2\cos\psi$$

In the complex plane (FIG. 2), the amplitude consequently oscillates as a function of $\psi$ between two limits $M_1$ ($\psi=0$) and $M_2$ ($\pi=\psi$). The illumination pattern in the image plane S′B′ is illustrated by a curve passing through a series of maxima having values $OM_1^2$ and $OM_2^2$, which values are dissimilar when $\epsilon$ is not zero. Vaisala and Zernike evaluated this eveness of the maxima for the precise detection of a slight phase error $\epsilon$ with respect to the quadrature.

FIGURES 3*a* and 3*b* diagrammatically show the effect on the energy distribution of changing the sign of the error $\epsilon$. FIGURE 3*a* corresponds to the case when $\epsilon$ is positive; $OM_1^2$ is therefore less than $OM_2^2$. In FIGURE 3*b*, $\epsilon$ is negative, and $OM_1^2$ is greater than $OM_2^2$. The distance between two maxima of one series (even or odd) depends on the arrangement.

The applicants conceived the idea, which is the foundation of their invention, of replacing slit source S by a periodic structure emitting incoherent vibrations, and in which the image $p'$, in plane S′B′, of the period $p$ of said structure would be equal to the distance between two maxima of one series (even or odd). In this case, $p'=\lambda/\alpha'$, $p'$ being shown in FIGS. 3*a* and 3*b*. It will be understood that, with a periodic structure consisting, for example, of a series of narrow slits, S, $S_1$, $S_2$ . . . $S_N$, separated by a distance $p$, the fringe patterns produced by these slits coincide. The appearance of the phenomenon does not change, except that the luminosity is increased.

Starting from these arguments and conclusions, the method of interference measurement, in accordance with the invention, essentially consists in replacing the usual slit source of the procedure of Vaisala-Zernike with at least one periodic structure emitting incoherent vibrations, which illuminate at least three slits.

The periodic structure emitting the incoherent vibrations is such that the size of the image of the period in the image plane of the source be as nearly as possible—and perferably—equal to the distance between two maxima of the curve of the resulting illumination of one series.

In order to practice the method of the invention, that is, in order to obtain the periodic structure, there can be used, for example, a pattern of slits separated by a distance equal to their width (which can be termed a Foucault grid). It is also possible to use two patterns spaced apart and laterally shifted with respect to each other, for the purpose of improving the precision. It will be understood that the pattern must be illuminated under conditions producing incoherent light, as by illuminating the pattern with a rapidly diverging beam.

The method can be practiced either by direct visual observation or by means of a transducer, by modulating, in the latter case, the light, or other emission, from the periodic structure for detection by the transducer, such as a photosensitive one.

Operating by modulation enables the convenient attainment of more accurate and more rapid measurements, as well as the expansion of the spectrum explored. Such transducers, for example, convert light energy into another form of energy, such as electrical, and enable the recording of the optical phenomena resulting from the method.

The method and apparatus that are the objects of the invention render possible the detection of very small variations in the optical path, as in the measurement of very small differences in indices of refraction (whether gas, liquid, or solid), as well as for precise longitudinal points and the curvature of surfaces.

The instruments of the invention preserve, at the very least, the sensitivity of the known Zernike arrangements while at the same time very substantially increasing the luminosity. It is quite obvious that the amount of light emitted by a periodic grid is much greater than can be emitted by a single stationary slit.

The distribution of illumination, using a Foucault grid and three slits $F_0$, $F_1$, and $F_2$, in accordance with the invention, is shown in FIGURES 4*a* and 4*b*. The maxima and minima are transposed when $\epsilon$ changes sign: $>\epsilon 0$ in FIGURE 4*a*, $\epsilon<0$ in FIGURE 4*b*. The sensitivity of such an arrangement easily can be studied from the contrast factor (or the transmission factor of a sinusoidal component of the object) which is equal to the auto-correlation function of the pupil constituted of three slits. But since it is sufficient to know the order of degree of this sensitivity, it suffices to recall that the sensitivity of the Zernike arrangement depends on the smallest difference in brightness that can be detected between maxima $OM_1^2$ and $OM_2^2$. If, for example, the three slits are identical and if one can detect a difference of 2% between the two series of maxima (in a visual experiment, for example), the expression is:

$$\frac{1+(2+\epsilon)^2-1-(2-\epsilon)^2}{5}=\frac{2}{100}, \text{ or } =\frac{5}{400}$$

of a radian, which indicates a path length sensitivity of the order of $\lambda/500$.

Figure 6:
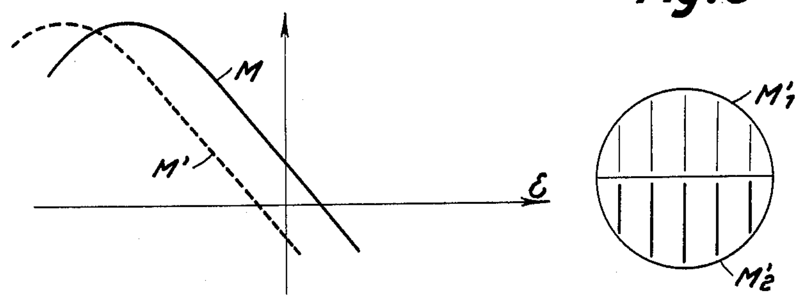
FIGURE 6 shows the curves of the variations in the contrast factor as a function of change in $\epsilon$.

In the arrangement of FIGURE 5 there are arranged two spaced apart patterns M and M′, illuminating slits $F_0$, $F_1$, and $F_2$. The spacing between M and M′ is experimentally determined, such that the variations in the contrast factor as a function of the variations imposed on $\epsilon$ by the longitudinal shift of the plane of focus be represented by the curves of FIGURE 6. It is known that a focusing error at point X′ measured along the optical axis causes a change in the optical path equal to $X'\alpha'^2/2$ and a corresponding phase shift $$\epsilon=\frac{\pi}{\lambda}X'\alpha'^2$$

The moment when the modulation is zero for a single pattern will no longer be examined, but it is far more accurate to measure the evenness of the image contrast.

Figure 8:
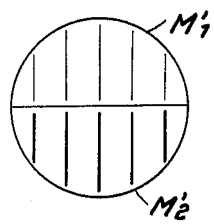
FIGURE 8 shows the juxtaposed images in the field of the embodiment of FIGURE 7.
Figure 7:
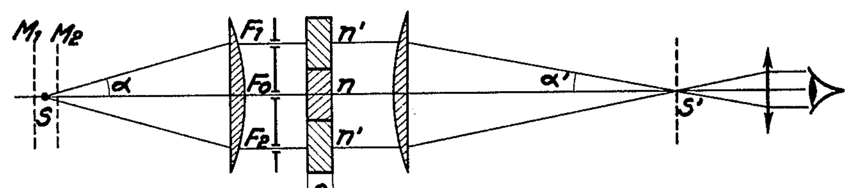
FIGURE 7 shows an embodiment of the invention.

An embodiment of the invention, using two patterns and three slits, and the relative positions of the two patterns, is shown by way of example in FIGURES 7 and 8. It is intended for the precise comparisons of refractive indices.

To compare the refractive indices $n$ and $n'$ of any two substances (solid, liquid, or gas) whose indices are very close to each other, a sample of thickness $e$ and index $n$ is placed behind slit $F_0$. Two samples of the same thickness $e$ and of index $n'$ are placed behind slits $F_1$ and $F_2$. The difference between the indices appears as an optical path length difference $(n'-n)e$. Since the sensitivity of the arrangement to the optical path length very easily attains 10 A. (or $\lambda/500$), a sample thickness $e$ of only one millimeter suffices to detect an index difference of $n'-n=10^{-6}$. Consequently, the instrument of the invention generally operates with very small sample thickness and, therefore, with very small amounts of the sample. This instrument recalls the interferometer of Rayleigh, wherein the two slits are replaced by three and the slit source S by two patterns $M_1$ and $M_2$ slightly spaced apart with respect to S and slightly shifted laterally, such that the two images are juxtaposed in the field of the instrument (FIG. 8).

The measurement can be made by introducing into the optical path an appropriate path length difference, variable at will and of any kind. For example, the two patterns $M_1$ and $M_2$ can be moved together along the optical axis. A movement X of the patterns introduces between $F_0$ and $F_1$, $F_2$ a path length difference equal to $X\alpha^2/2$. Or, instead of moving the patterns, the plane of focus at point S′ can be shifted. In this case the path length difference is equal to $X'\alpha^2/2$.

Figure 9:
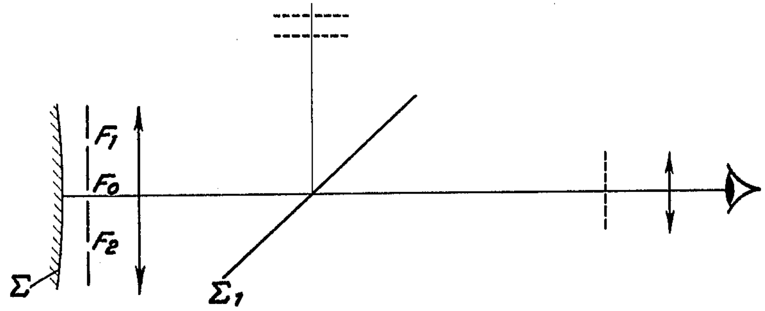
FIGURE 9 shows an embodiment of the invention for measuring the curvature of a surface.

To measure the curvature of a reflecting surface $\epsilon$, slits $F_0$, $F_1$, and $F_2$ are arranged along said surface, as shown in FIGURE 9. A semi-reflecting surface $\epsilon_1$ is then used to observe the phenomenon.

When operating with modulation, for the purpose of using a transducer, such as photomultiplier, either the periodic object (that is, whatever means causing the modulated structure) or the slit can be shifted, or both simultaneously can be moved, or the relative positions between the slit and the period object can be changed, or, finally, the modulation position can be changed.

In one embodiment, the image can be directly analyzed by having recourse to electronic sweeping of the image plane.

The required modulation signals can be obtained in various ways. For example, the periodic object can be moved uni-directionally or back and forth in its plane in a direction normal to its narrow openings, while the slit remains stationary and its length parallel to the narrow openings of the periodic object. To this end, any known scheme can be adopted, such as a tuning fork, a rotating wheel or mirror, or any other means, while in every case taking the usual care that the displacement at least is equal to the size of the periodic object and that the focusing errors are less than a certain fraction of the optical path. It is also possible, using the same means under the same conditions, to reciprocate the slit arranged in a plane normal to the optical axis, while the periodic object remains stationary; or the two can be moved simultaneously. Two examples of modulated operation will now be described with reference to FIGURES 10 and 11.

Figure 10:
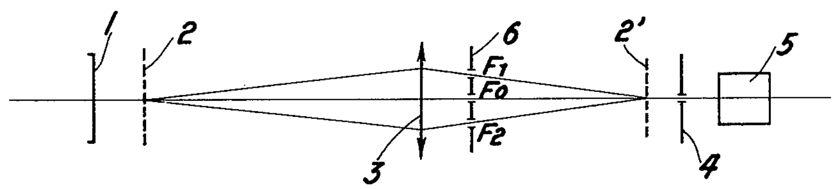
FIGURES 10 and 11 show another embodiment of the invention.

In FIGURE 10, 1 is monochromatic source, 2 a periodic object, such as Foucault grid of FIGURE 5, whose regularly spaced narrow openings have a spatial frequency $1/p$; 3 is an objective imaging the periodic object at 2′, near a slit 4 having a width less than $p/2$ thereby materializing the plane of focus. The longitudinal sides of slit 4 are parallel to the narrow openings of periodic structure 2. Three slits $F_0$, $F_1$ and $F_2$, arranged parallel to the narrow openings of the periodic object 2, stop down the beam issuing from objective 3. A photosensitive transducer 5, arranged behind slit 4, detects and analyzes, according to the different planes of focus, the modulation of the image caused by the periodic object 2 being moved for example by a suitably regulated tuning fork, not shown.

As already explained, a phase shift $\Delta\psi$ can be measured by introducing it into one or two of the beams leaving slits $F_0$, $F_1$, and $F_3$ and then compensating for it in the usual manner or by calibrating the arrangement before hand, likewise in a known manner.

Figure 11:
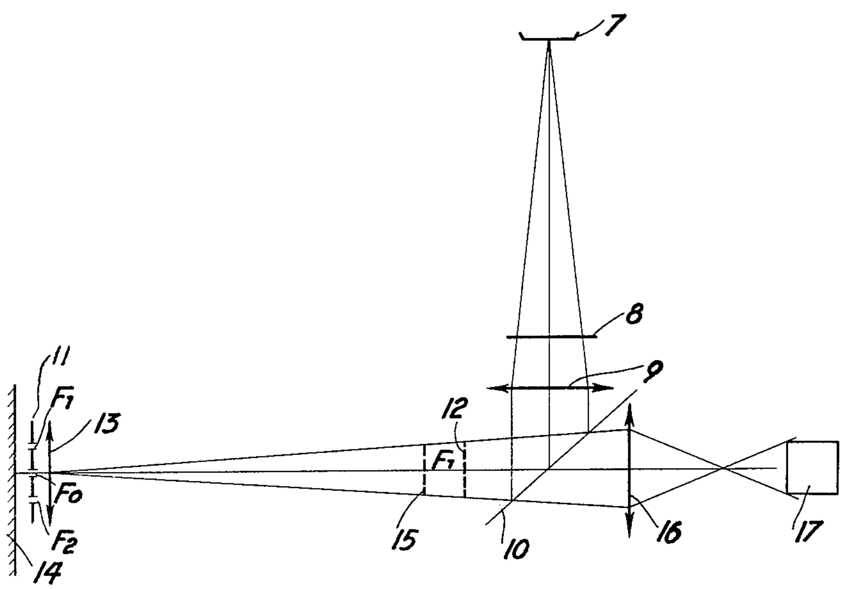

In the arrangement of FIGURE 11, the single analyzing slit has been replaced by a periodic object, for the purpose of increasing the illumination. In the embodiment shown, the arrangement works by autocollination and comprises a light source 7 illuminating, through a spectral filter 8, a condenser lens 9 which forms an image, after the beam is deviated by a semi-reflecting optical plate 10, in plane 11 of the three slits $F_0$, $F_1$, and $F_2$ of the pupil of the instrument. The spectral filter is of any known kind that absorbs nearly all of the spectrum of the source, thereby obtaining a substantially monochromatic beam.

The periodic object 12, here consisting of a series of parallel slits in the object plane, is positioned in the rear of the focal point F of the objective 13, which is mounted behind the nearly plane of the slits and in front of which is positioned a plane reflecting surface 14 (plane mirror or reflecting optical plate). In any known manner, structure 12 is given an uni-directional or reciprocatory movement in its plane perpendicular to the direction of its slits, so as to obtain a varying signal. The combination of objective 13 and flat surface 14 can be replaced by a concave spherical mirror, having its center at F. Under these conditions, the reflected paraxial image is formed in plane 15. The distance between object and image planes 12 and 15, respectively, gives rise to a focusing error, which leads to a variation in the modulation amplitude or, in certain positions, to no modulation. Detection is effected through a series of slits, which, in this instance, is the periodic object 12 itself. The variation of the modulation amplitude is partly shown in FIGURE 6. The series of slits can also be positioned next to image 15 (see slit 4 in FIGURE 10). An objective 16, positioned perpendicularly to the optical axis, directs the image, in the form of a varying signal, onto a phototransducer 17, the output of which can be used in any desired way.

The method and apparatus of the invention have a variety of uses:

(A) *Automatic quality control of transparent optical plates.*—Either the changes in the optical path with respect to a standard or inhomogeneity in any direction, of a transparent plate, can be recorded. The method is perfectly adaptable to mass-production, wherein the articles are moved past the instrument.

(B) *Spectrometry (eventually).*—The variation of the modulation function and its connection with wave length can be made use of.

(C) *Flatness of surfaces.*—The variations in a surface with respect to an ideal plane can be recorded or else the radii of curvature.

(D) *Direct measurement of thin layers, as in refractometers and micro-refractometers.*—The refractometry of gases, liquids, and solids can be directly observed, so as to effect a continuous control of the physical constants or of their charge in the gases, to check and regulate the concentration of two or more fluids, etc.

(E) *Measurement of the aberration of optical systems.*—

(F) *Measurement of the position of mechanical parts.*— In this use, expansions can be observed, tiny mechanical distortions detected, temperatures regulated, etc. . . .

Finally, the method of the invention permits the production of exact longitudinal pointings, using, for example, the arrangement of FIGURE 7 without the samples.

In the foregoing description it will be understood that light illumination, luminosity, and such terms refer to the invisible, as well as to the visible, spectrum.

What we claim is:

1. In an interferometer, the combination including a source of optical energy, periodic object grid means through which said energy is passed, said grid means having a plurality of slits, imaging means for forming an image of said slits in an image plane, at least three slit means located transversely in the path of said energy to said image, the image produced in said image plane containing a plurality of overlapping fringe patterns, the spacing between the slits being such that the image in the image plane is substantially equal to the distance between two maxima of the fringe patterns, and means to observe said fringe patterns.

2. An apparatus according to claim 1 wherein the periodic grid means is composed of two periodic means spaced apart.

3. A device according to claim 1 including sample holding means in the optical path between said three slit means and the image formed by said imaging means.

4. An apparatus according to claim 1 including reflecting means irradiated by said periodic means, said three slit means being irradiated on one side by energy reflected by said reflecting means, and means supporting a reflecting test piece on the opposite side of said slits.

References Cited by the Examiner

UNITED STATES PATENTS

| | | | |
|---|---|---|---|
| 2,668,471 | 2/1954 | Benzinger et al. | 88—14 |
| 2,867,148 | 1/1959 | Svensson | 88—14 |
| 3,045,531 | 7/1962 | Prescott. | |

OTHER REFERENCES

Wolter: German application, 1,031,991, printed, June 12, 1958, (KL 42h 34/11), 1 sheet dwg., 3 pages spec.

JEWELL H. PEDERSEN, *Primary Examiner.*

J. K. CORBIN, *Assistant Examiner.*